United States Patent
Apreutesei et al.

(10) Patent No.: US 7,594,020 B2
(45) Date of Patent: Sep. 22, 2009

(54) RE-ESTABLISHING A CONNECTION FOR AN APPLICATION LAYER VIA A SERVICE LAYER

(75) Inventors: Elena Apreutesei, Redmond, WA (US); Nagendra V. Kolluru, Redmond, WA (US); Nikhil Bobde, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 522 days.

(21) Appl. No.: 11/142,901

(22) Filed: May 31, 2005

(65) Prior Publication Data

US 2006/0271681 A1    Nov. 30, 2006

(51) Int. Cl.
*G06F 15/16*    (2006.01)

(52) U.S. Cl. .......................... 709/227; 709/228

(58) Field of Classification Search ................ 709/227, 709/228; 719/328
See application file for complete search history.

(56) References Cited

U.S. PATENT DOCUMENTS

| | | | |
|---|---|---|---|
| 7,089,311 B2 * | 8/2006 | Devine et al. ............... 709/227 |
| 7,133,891 B1 * | 11/2006 | Uceda-Sosa et al. ........ 709/203 |
| 7,177,642 B2 | 2/2007 | Sanchez Herrero et al. | |
| 7,395,336 B1 * | 7/2008 | Santharam et al. ......... 709/227 |
| 2001/0040945 A1 * | 11/2001 | Fujino et al. ............. 379/93.09 |
| 2002/0103909 A1 * | 8/2002 | Devine et al. ............... 709/227 |
| 2002/0111949 A1 * | 8/2002 | Barga et al. ................... 707/10 |
| 2002/0191795 A1 | 12/2002 | Wills | |
| 2003/0135542 A1 * | 7/2003 | Boudreau ................... 709/203 |
| 2003/0188195 A1 * | 10/2003 | Abdo et al. ................. 713/201 |
| 2004/0193941 A1 * | 9/2004 | Barr et al. ...................... 714/4 |
| 2005/0138428 A1 * | 6/2005 | McAllen et al. ............. 713/201 |
| 2005/0198379 A1 * | 9/2005 | Panasyuk et al. ........... 709/239 |
| 2005/0198397 A1 * | 9/2005 | Park ........................... 709/248 |
| 2005/0260989 A1 * | 11/2005 | Pourtier et al. ........... 455/435.3 |
| 2006/0063544 A1 * | 3/2006 | Zhao et al. .................. 455/510 |
| 2006/0067244 A1 | 3/2006 | Sekaran et al. | |
| 2007/0005773 A1 | 1/2007 | Apreutesei et al. | |

OTHER PUBLICATIONS

IEEE 100 The Authoritative Dictionary of IEEE Standards Terms 7th Ed., 2000, p. 650 and 682-683.*
J. Rosenberg et al., SIP: Session Initiational Protocol, Jun. 2002, IETF, p. 1-26 http://www.ietf.org/rfc/rfc3261.txt.*
U.S. Appl. No. 11/142,895, filed May 31, 2005, Apreutesei et al.

* cited by examiner

*Primary Examiner*—Bunjob Jaroenchonwanit
*Assistant Examiner*—Jimmy H Tran
(74) *Attorney, Agent, or Firm*—Perkins Coie LLP

(57) ABSTRACT

A method and system for establishing a connection with a server after a connection has been broken is provided. A connection system in a service layer of a client detects that a connection between the client and the server has been broken. Upon detecting the broken connection, the connection system of the service layer automatically attempts to re-establish an application-level connection to the server. If the connection system can re-establish an application-level connection to the server, then it need not notify the application layer of the broken connection.

24 Claims, 6 Drawing Sheets

RE-ESTABLISHING A CONNECTION FOR AN APPLICATION LAYER VIA A SERVICE LAYER

BACKGROUND

Users of computing devices (e.g., laptops, cellular phones, and personal digital assistants) often need to communicate in real time. A common form of real-time communications is provided by instant messaging services. An instant messaging service allows participants at endpoints to send messages and have them received within a second or two by the other participants in a conversation. The receiving participants can then send responsive messages to the other participants in a similar manner. To be effective, a real-time conversation relies on the participants' becoming aware of, reviewing, and responding to received messages very quickly. This quick response is in contrast to conventional electronic mail systems in which the recipients of electronic mail messages respond to messages at their convenience.

To support real-time communications, communications applications typically need to establish and manage connections (also referred to as sessions or dialogs) between computing devices. A session is a set of interactions between computing devices that occurs over a period of time. As an example, real-time communications applications such as MESSENGER or VoIP establish sessions between communicating devices on behalf of users. These applications may use various mechanisms to establish sessions, such as a "Session Initiation Protocol" ("SIP"). SIP is an application-level control protocol that computing devices can use to discover one another and to establish, modify, and terminate sessions between computing devices. SIP is a proposed Internet standard. The SIP specification, "RFC 3261," is available at via the Internet Engineering Task Force ("IETF") web site.

A SIP network comprises entities that can participate in a dialog as a client, server, or both. SIP supports four types of entities: user agent, proxy server, redirect server, and registrar. User agents initiate and terminate dialogs by exchanging messages with other SIP entities. A user agent can be a user agent client ("UAC"), which is a device that initiates SIP requests, or a user agent server ("UAS"), which is a device that receives SIP requests and responds to such, requests. As examples, "IP-telephones," personal digital assistants, and any other type of computing device may be user agents. A device can be a UAC in one dialog and a UAS in another, or may change roles during the dialog. A proxy server is a device that acts as a server to clients and a client to servers. In so doing, proxy servers intercept, interpret, or forward messages between UACs and UASs. A redirect server is a device that accepts a SIP request and generates a response directing the UAC that sent the request to contact an alternate network resource. A registrar is a server that accepts registration information from user agents and informs a location service of the received registration information.

SIP supports two message types: requests, which are sent from a UAC to a UAS, and responses, which are sent from a UAS to a UAC when responding to a request. A SIP message is composed of three parts. The first part of a SIP message is a "request line," which includes fields to indicate a message method (e.g., INVITE) and a Request URI that identifies the user or service to which the request is being directed. The second part of a SIP message comprises headers whose values are represented as name-value pairs. The third part of a SIP message is the message's body, which is used to describe the session to be initiated or contain data that relates to the session. Message bodies may appear in requests or responses.

User agents can communicate by sending SIP messages during a SIP dialog. A SIP dialog is a peer-to-peer relationship between two user agents that persists for some time. A dialog may be established when a UAC sends an INVITE request to a UAS and the UAS replies with a 200 OK response.

Applications may employ SIP with a lower-level protocol to send or receive messages. SIP may use lower-level connections to transport a dialog's messages, such as Transmission Control Protocol/Internet Protocol ("TCP/IP"), which are commonly employed transport- and network-layer protocols. Transmission Control Protocol ("TCP") is a connection-oriented, reliable delivery transport layer protocol. TCP is typically described as a transport layer that provides an interface between an application layer (e.g., an application using SIP) and a network layer. The application layer generally communicates with the TCP layer by sending or receiving a stream of data (e.g., a number of bytes of data). TCP organizes this data stream into segments that can be carried by the protocol employed at the network layer, e.g., the Internet Protocol ("IP"). These segments of data are commonly referred to as "packets," "frames," or "messages." Each message generally comprises a header and payload. The header comprises data necessary for routing and interpreting the message. The payload comprises the actual data that is being sent or received. The application, transport, and network layers, together with other layers, are jointly referred to as a data communications stack.

When an initiating participant wants to start a real-time conversation, that participant needs to know whether the intended participants are available to respond in real time to a message. If not, then communications via conventional electronic mail, voice mail, or some other mechanism may be more appropriate. For example, if the computers of the intended participants are currently powered off, then a real-time conversation may not be possible. Moreover, if their computers are currently powered on, but the intended participants are away from their computers, a real-time conversation is also not possible. The initiating participant would like to know the availability of the intended participants so that an appropriate decision on the form of communication can be made.

The availability status of an entity such as a computer system (i.e., endpoint) or a user associated with that computer system is referred to as "presence information." Presence information identifies the current "presence state" of the user. Users make their presence information available so that other users can decide how best to communicate with them. For example, the presence information may indicate whether a user is logged on ("online") with an instant messaging server or is logged off ("offline"). Presence information may also provide more detailed information about the availability of the user. For example, even though a user is online, that user may be away from their computer in a meeting. In such a case, the presence state may indicate "online" and "in a meeting."

In an instant messaging context, a publishing user ("publisher") may provide their presence information to a presence server that then provides the presence information to subscribing users ("subscribers"). Thus, a presence server may use a subscriber/publisher model to provide the presence information for the users of the presence service. Whenever the presence information of a user changes, the presence server is notified of the change by that user's computer system and in turn notifies the subscribing users of the change. A subscribing user can then decide whether to initiate an instant messaging conversation based on the presence information of the intended participants. For example, if the presence information indicates that a publishing user is currently in a conference telephone call, then the subscribing user may decide to send an instant message, rather than place a telephone call, to the publishing user. If the subscribing user, however, needs to call and speak with the publishing user, the subscribing user needs to monitor the presence information of the publishing user to know when the call can be placed. When the subscribing user notices that the publishing user's presence information indicates that the telephone conference has been concluded, the subscribing user can then place the telephone call. A specification relating to presence information in instant messaging systems, "RFC 2778," is available via the IETF web site. A draft of a proposed specification relating to presence information in SIP is available at via the IETF web site.

Because of the popularity of instant messaging and other real-time services, a provider of such services often needs to provide a pool of servers to support the real-time service. For example, a large organization may need to provide presence information for tens of thousands of users. Because of the real-time requirements and the high volume of communications that are sent between the clients and servers of a presence service, a single server is typically not sufficient. Although the presence service may be provided by a pool of presence servers, the pool appears as a single presence server to the client. For example, when a client logs on to or establishes a connection with a presence service, the logon request may be routed through a load balancer that selects an available server of the server pool and directs the logon request to the selected server. When a client publishes presence information of its user, the client's server provides the presence information to the client's subscribers.

Connections between clients and servers can be broken for various reasons. For example, if a client is connected to a server via a wireless network, then a problem with the wireless communications may cause a connection to be broken. When a server notices that its connection to a client has been broken, it will typically log off the client (e.g., terminate the application-level connection of that client). When the client notices the broken connection, the application layer of the client is typically notified of the broken connection by a service layer (or stack layer) of the client. The application layer may notify the user of the broken connection and attempt to log back on to the server. When a user with a wireless computing device moves about, the connection with the network can be broken because of gaps in the area serviced by the wireless network, communications errors, interference, and so on. Such users may find it annoying to be notified of every broken connection especially when the user will typically want to immediately re-log on to the server.

A broken connection may also result from a hardware or software failure at the server. Clients that are logged on through a server will typically notice that the connection (e.g., TCP connection) with that server has been broken. Upon detecting the broken connection, each client may try to re-log on to a server. If hundreds or thousands of clients are impacted by the failure and immediately send logon requests to the server pool, the server pool may become overloaded and be unable to service the requests in a timely fashion. Moreover, a client that sends a logon request may detect that the server pool has not responded in a timely manner and re-send the logon request. As a result, the server pool will become even more overloaded in a cascading manner.

SUMMARY

A method and system for establishing a connection with a server after a connection has been broken is provided. A connection system in a service layer of a client detects that a connection between the client and the server has been broken. Upon detecting the broken connection, the connection system of the service layer automatically attempts to re-establish an application-level connection to the server. If the connection system can re-establish an application-level connection to the server, then it need not notify the application layer of the broken connection. If the connection system cannot re-establish an application-level connection to the server, it notifies the application layer of the broken connection so that the application layer can process the broken connection as appropriate.

The connection system of a client may also delay the re-establishing of a connection with a server by a client-specific delay. Because each client has a client-specific delay, when a server fails, the attempts of the clients of the server to re-establish a connection will be spread over the range of client-specific delays. If the connection system of a client is unsuccessful in re-establishing the connection, it may delay attempting to again re-establish a connection with a server by an increasingly longer client-specific delay. If the connection system is unable to re-establish a connection within a certain time limit, the connection system may notify the application layer so that the application layer can process the broken connection.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
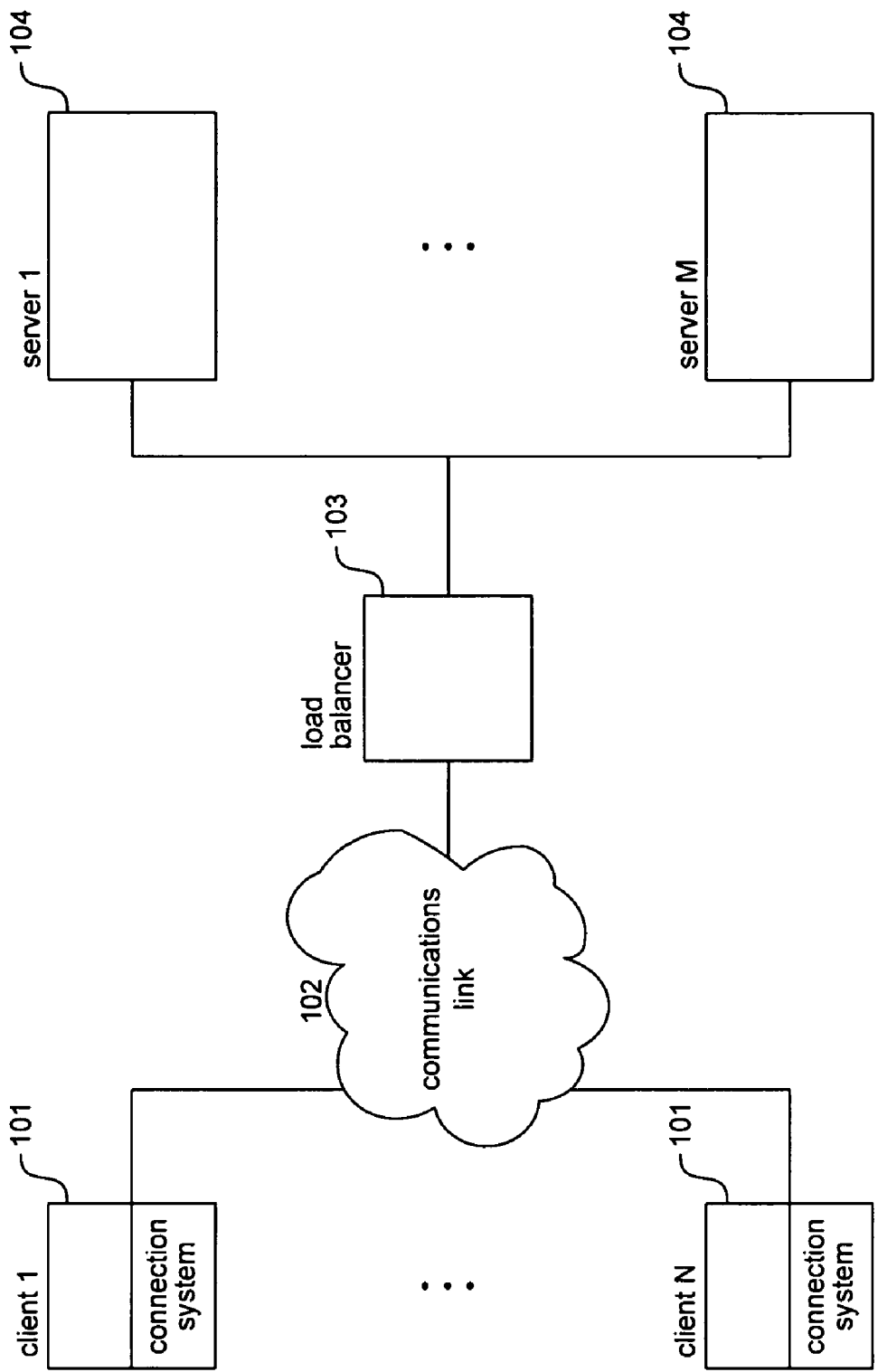
FIG. 1 is a block diagram that illustrates clients connected to a server pool for providing a service in one embodiment.

A method and system for establishing a connection with a server after a connection has been broken is provided. In one embodiment, a connection system in a service layer of a client detects that a connection between the client and the server has been broken. The service layer of the client may provide to the application layer of the client an application programming interface ("API") for accessing the services provided by the server. Upon detecting the broken connection, the connection system of the service layer automatically attempts to establish an application-level connection to the server. If the connection system can re-establish an application-level connection to the server, then it need not notify the application layer of the broken connection. The application layer can continue to request services of the service layer without even knowing that the connection has been broken and re-established. If the connection system cannot re-establish an application-level connection to the server, it notifies the application layer of the broken connection so that the application layer can process the broken connection as appropriate. As an example, if a presence service client uses SIP as an application-level protocol and TCP/IP as a communications-level protocol, the connection system in the service layer detects when a TCP connection to the server is broken. Upon detecting the broken connection, the connection system attempts to establish a new dialog with a presence server by sending a SIP INVITE request to the presence server. The sending of the SIP INVITE request causes a TCP connection to be established with the server. When the connection system receives the INVITE response indicating that a presence-level connection has been re-established, it can continue providing presence services to the application layer. In this way, when a connection between a client and a server is broken, an application-level connection can be re-established between the client and the server by a service layer of the client without having to notify the application layer of the client.

In one embodiment, the connection system of a client delays the re-establishing of a connection with a server by a client-specific delay. For example, each client may generate its client-specific delay as a randomly generated time between one and 60 seconds. Because each client has a client-specific delay, when a server fails, the attempts of the clients of the server to reestablish a connection will be spread over the range of client-specific delays (e.g., 60 seconds). If the connection system of a client is unsuccessful in re-establishing the connection, it may delay attempting to again re-establish a connection with a server by an increasingly longer client-specific delay. For example, the connection system may double the previous client-specific delay. If a connection system is unable to re-establish a connection within a certain time limit, the connection system may notify the application layer so that the application layer can process the broken connection. In this way, overloading of the servers may be avoided because the connection system spreads the attempts of clients over a time range so that not too many clients are attempting to re-establish the connection at the same time.

FIG. 1 is a block diagram that illustrates clients connected to a server pool for providing a service in one embodiment. Clients 101 are connected via communications link 102 to a server pool that includes a load balancer 103 and servers 104. Each client includes an application layer and a service layer. The connection system is part of the service layer of the client. A client establishes an initial application-level connection with a server by sending an application-level connection request (e.g., a SIP INVITE request or a logon request) via the communications link to the load balancer. Upon receiving the connection request, the load balancer identifies an available server and forwards the connection request to that server. If the server determines that it can accept the request, it may send a response to the client indicating that the application-level connection has been established. The response may be sent via the load balancer or may be sent from the server to the client bypassing the load balancer. Upon receiving the response, the application layer of the client can then invoke the API of the service layer to request the server to provide services on behalf of the client. When the connection system detects that the application-level connection with the server has been broken, it attempts to re-establish the connection with the server by sending an application-level connection request to the server. The connection system may detect that the application-level connection is broken indirectly by detecting that a communications-level connection (e.g., a TCP connection) with the server has been broken. A communications-level connection may be established using any lower-level connection protocol that can be used to transmit application-level messages. Upon receiving the connection request, the load balancer again selects a server (which may be different from the previously selected server) and forwards the connection request to that server. When the connection system of the service layer receives the response indicating that the application-level connection has been established, the service layer of the client can continue providing services to the application layer of the client without providing notification that the connection was broken or re-established. If the application layer requests services of the service layer while the service layer is attempting to re-establish a connection, the service layer may queue the request or report back to the application layer that the application-level connection is temporarily unavailable.

The computing device on which the connection system is implemented may include a central processing unit, memory, input devices (e.g., keyboard and pointing devices), output devices (e.g., display devices), and storage devices (e.g., disk drives). The memory and storage devices are computer-readable media that may contain instructions that implement the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the connection system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
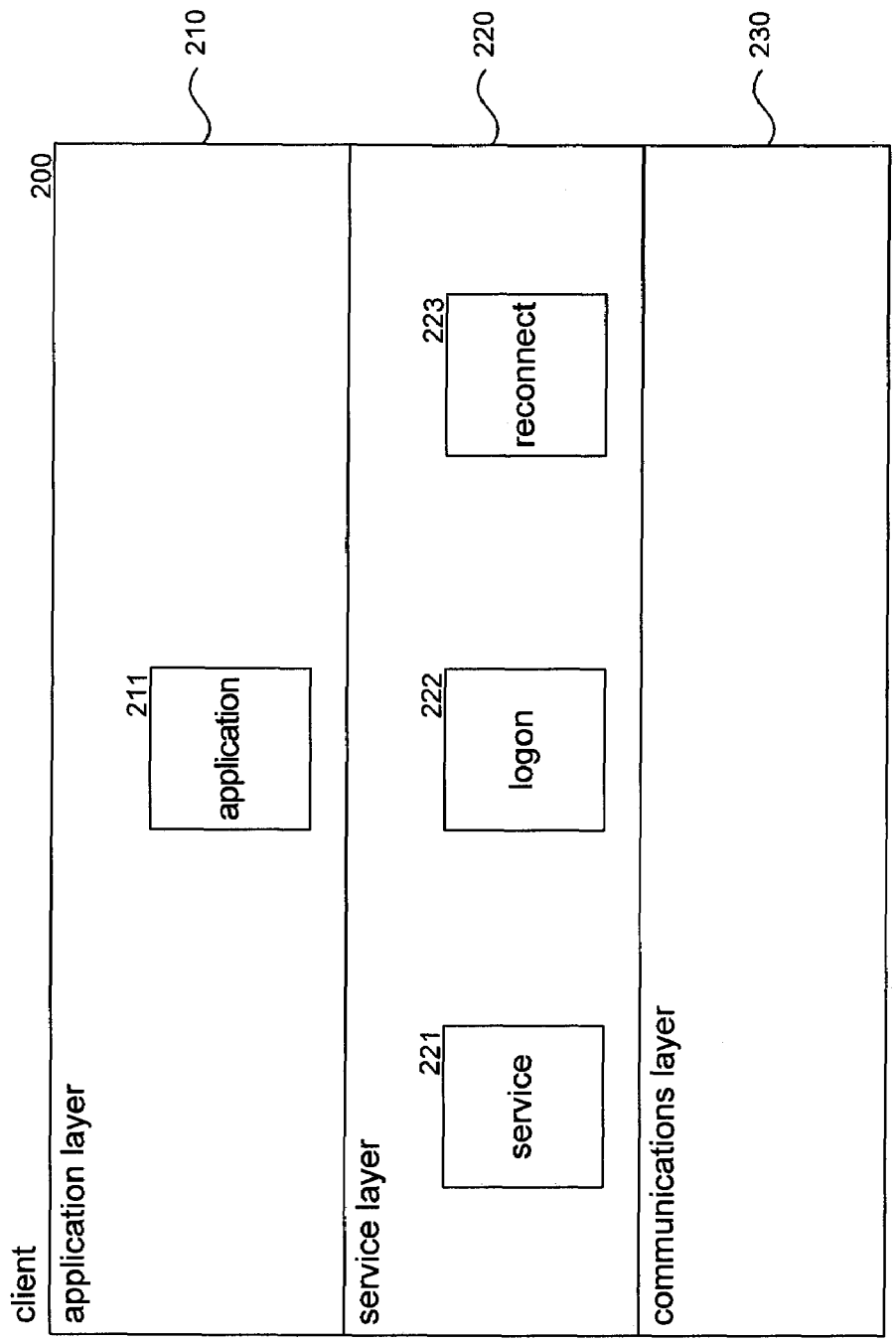
FIG. 2 is a block diagram illustrating components of a client in one embodiment.

FIG. 2 is a block diagram illustrating components of a client in one embodiment. The client 200 includes an application layer 210, a service layer 220, and a communications layer 230. The client may provide the functionality of an instant messaging client, a presence service client, a voice over IP client, or any other client that establishes an application-level connection with a server. The application layer includes an application component 211 that implements the application-specific functionality of the client. For example, when the client is an instant messaging client, the application component may control the instant messaging user interface and send and receive instant messages using an application programming interface of the service layer. The service layer provides an application programming interface to support the functionality of the application component. For example, the application programming interface may provide a function for logging a user on to the instant messaging service, a function for sending an instant message, and so on. The service layer may include a service component 221, a logon component 222, and a reconnect component 223. The application component invokes the functions of the application programming interface to implement the functionality of the client. The logon component coordinates the establishing of an application-level connection (e.g., logon) with the server. The reconnect component is invoked when the service layer detects that the application-level connection with the server has been broken. The reconnect component attempts to re-establish the application-level connection with the server by invoking the logon component. The communications layer provides the communications protocol, such as a transport protocol, for establishing a communications-level connection with the server and for transporting messages of the application-level protocol to the server.

Figure 3:
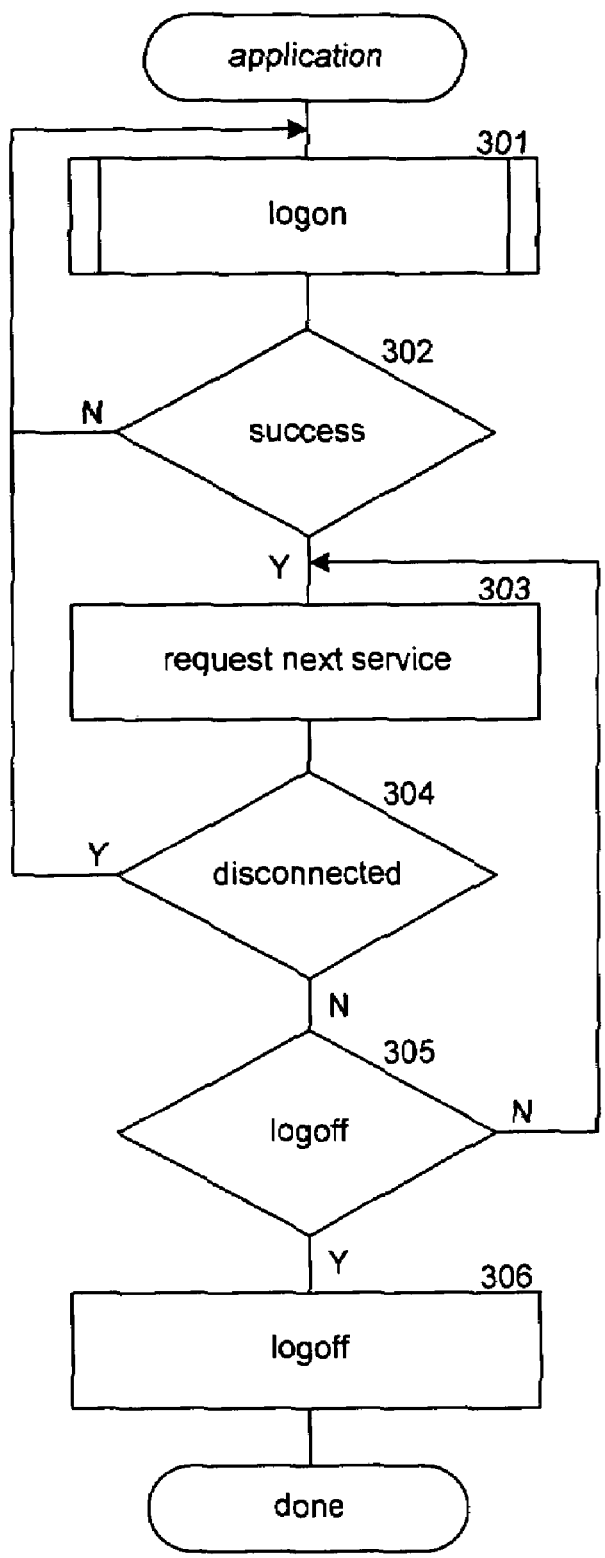
FIG. 3 is a flow diagram that illustrates the processing of an application component of the application layer in one embodiment.

FIG. 3 is a flow diagram that illustrates the processing of an application component of the application layer in one embodiment. The application component establishes an application-level connection with the server, implements the functionality of the application layer, and breaks the application-level connection when its processing is complete. In block 301, the component invokes the logon component of the service layer, which may be exposed through the application programming interface to establish an application-level connection with the server. In decision block 302, if the connection was successfully established, then the component continues at block 303, else the component loops to block 301 to again attempt to establish the application-level connection. In block 303, the component invokes the functions of the application programming interface to request services be performed. In decision block 304, if the component is notified by the service layer that the application-level connection has been broken, then the component loops to block 301 to attempt to re-establish the application-level connection, else the component continues at block 305. Rather than attempt to re-establish the connection, the component may take other appropriate action such as terminating the client. In decision block 305, if the client is ready to break the connection with the server (e.g., log off), then the component continues at block 306 to effect the breaking of the connection and then completes, else the component loops to block 303 to request that the next service of the client be performed.

Figure 4:
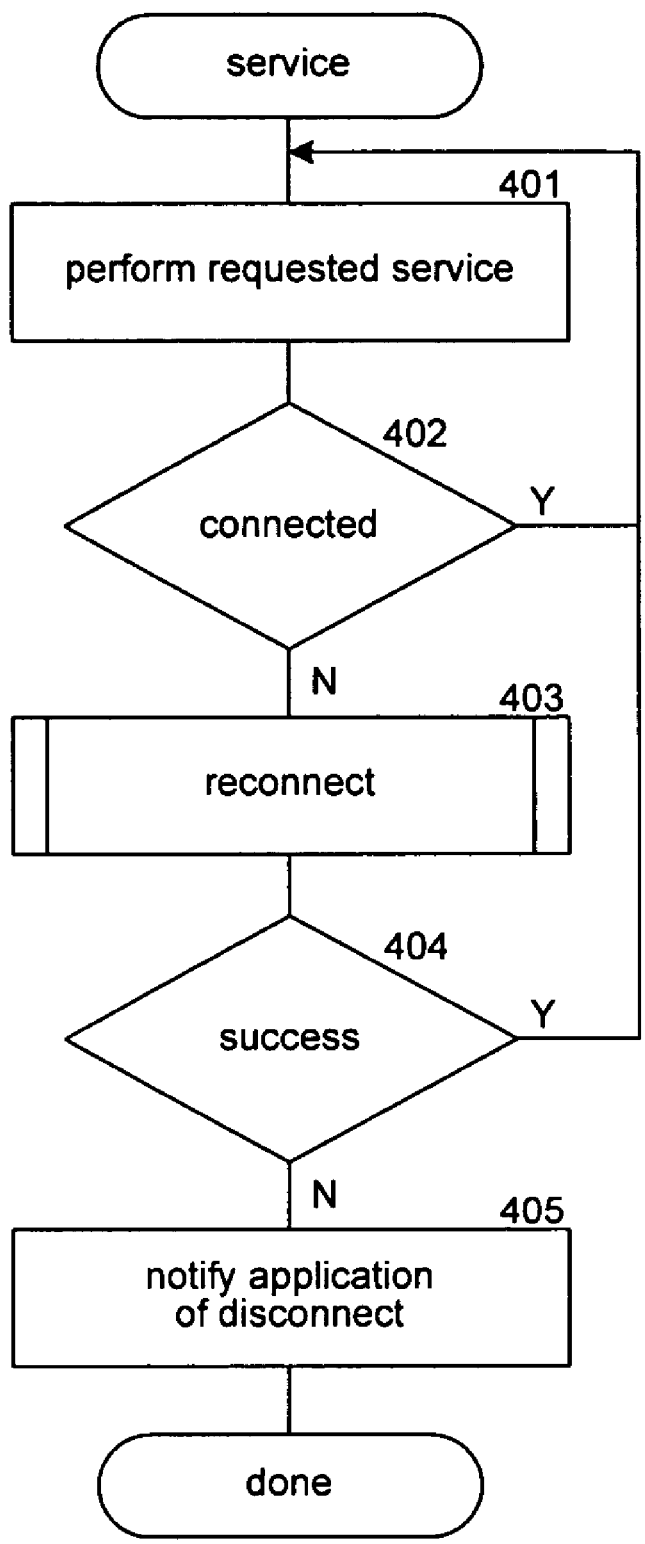
FIG. 4 is a flow diagram that illustrates the processing of the service component of the service layer in one embodiment.

FIG. 4 is a flow diagram that illustrates the processing of the service component of the service layer in one embodiment. The service component is invoked when the application layer requests the service layer to perform a service. In block 401, the component performs the requested service. In decision block 402, if the component detects that the client is still connected to the server at the application level, then the component loops to block 401 to process the next service request, else the component continues at block 403. In block 403, the component invokes the reconnect component to attempt to reconnect the client to the server at the application level. In decision block 404, if the attempt to reconnect was successful, then the component loops to block 401 to perform the next requested service, else the component continues at block 405. In block 405, the component notifies the application that the application-level connection has been broken and then completes.

Figure 5:
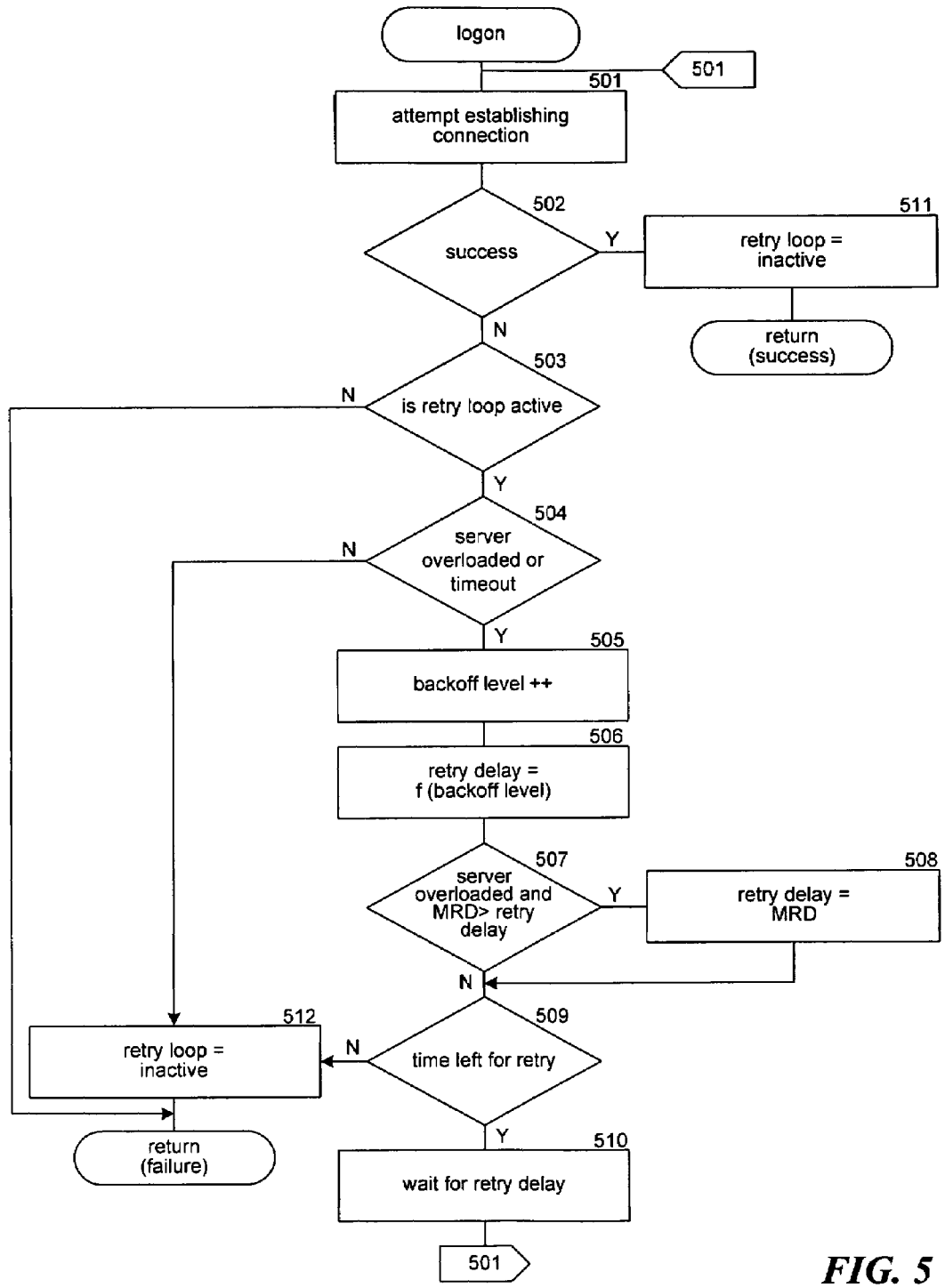
FIG. 5 is a flow diagram that illustrates the processing of the logon component of the service layer in one embodiment.

FIG. 5 is a flow diagram that illustrates the processing of the logon component of the service layer in one embodiment. The component is invoked when the application layer attempts to initially establish a connection with a server and when the service layer attempts to re-establish a connection with the server. If the component is invoked by the application layer to initially establish a connection and is unsuccessful in doing so after the first attempt, it may notify the application layer that the connection cannot be established without re-attempting to establish the initial connection. In block 501, the component attempts to establish an application-level connection with a server. The component may send an application-level connection request to the communications layer. The communications layer then sends the request to the server using a communications protocol that may or may not be connection-based. In decision block 502, if the application-level connection is established, then the component sets the retry loop flag to inactive in block 511 and returns an indication of success, else the component continues at block 503. In decision block 503, if the logon component was invoked to attempt to re-establish a connection as indicated by a retry loop flag being active, then the component continues at block 504, else the component returns a failure indication. In decision block 504, if the attempt to establish the application-level connection was not successful because the server was overloaded or because the connection request timed out before a response was received, then the component continues at block 505. If the attempt to re-establish the application-level connection was not successful for a reason unrelated to a possible overload of the server (e.g., the user does not have permission to use the service provided by the server), then the component sets the retry loop flag to inactive in block 512 and returns an indication of failure. In blocks 505-510, the component calculates a retry delay and delays the attempt to re-establish the connection by that amount. In block 505, the component increments a backofflevel variable. The backofflevel variable counts the number of attempts to re-establish the connection. In block 506, the component calculates the retry delay as a function of the backofflevel variable. In one embodiment, the function may be $1+\text{rand}() \bmod (\text{TIME}*2^{\text{backofflevel}})$ where TIME is the range (e.g., 60 seconds) of the initial retry delay. This function provides a range of retry delays that increases exponentially. Many different exponential and non-exponential functions may be used to calculate the increasing range from attempt to attempt. The range may alternatively be constant (e.g., 60) and not increase from one attempt to the next. In decision block 507, if the server was overloaded and provided a minimum retry delay that is greater than the calculated retry delay, then the component sets the retry delay to the minimum retry delay in block 508. If the server is overloaded, it may provide the minimum retry delay to clients so that the clients can delay their attempts based on the severity of the overload as determined by the server. The component then continues at block 509. In block 509, if there is still time left to attempt re-establishing the connection, then the component continues at block 510, else the component sets the retry loop flag to inactive and then returns a failure. The component may be allocated a certain maximum time (e.g., 8 minutes) for re-establishing a connection. If the component cannot re-establish the connection within that maximum time, then the component reports to the application layer that the application-level connection has been broken. In block 510, the component waits for the retry delay and then loops to block 501 to attempt to re-establish the application-level connection with the server.

Figure 6:
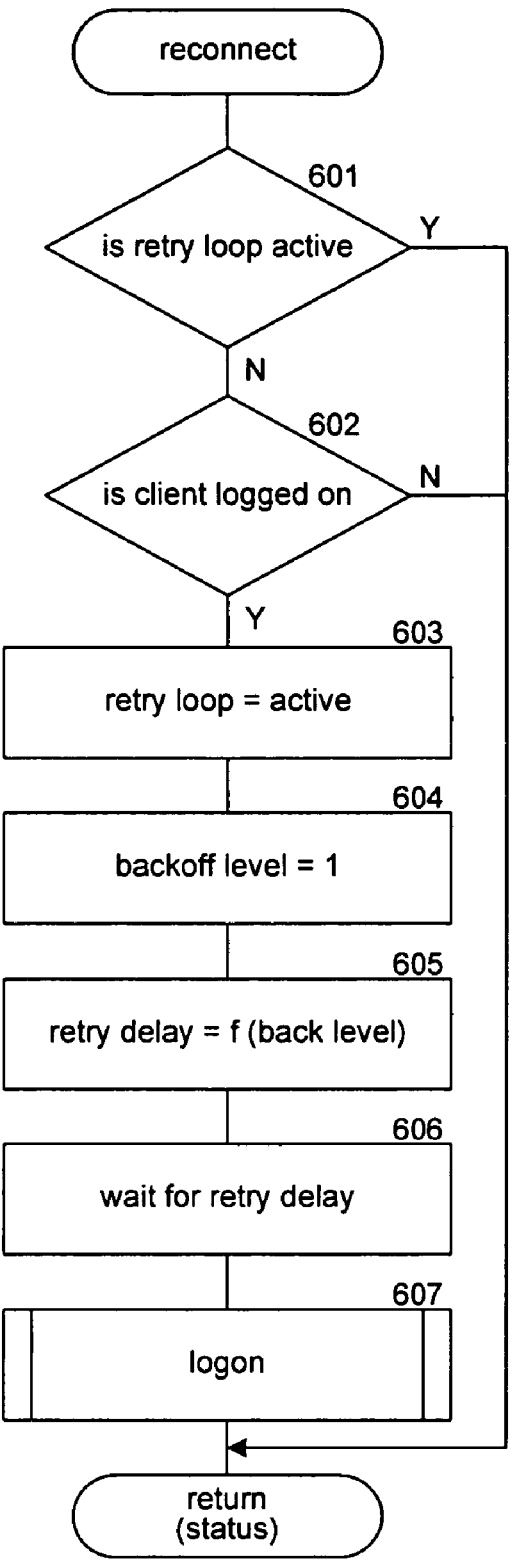
FIG. 6 is a flow diagram that illustrates the processing of the reconnect component of the service layer in one embodiment.

FIG. 6 is a flow diagram that illustrates the processing of the reconnect component of the service layer in one embodiment. The reconnect component is invoked when the service layer detects that the application-level connection has been broken. The reconnect component may detect that the application-level connection has been broken when the communications layer reports that the communications-level connection has been broken. Alternatively, if the communications layer implements a communications protocol that is connectionless, the service layer may detect that the application-level connection is broken using other mechanisms. For example, the client may periodically send heartbeat messages to the server. If the server does not respond to a heartbeat message within a certain time period, then the service layer may assume that the application-level connection is broken. In decision block 601, if the retry loop flag is active, then the service layer is already attempting to re-establish the application-level connection and the component returns, else the component continues at block 602. In decision block 602, if the client previously had an application-level connection established with the server, then the component continues at block 603 to attempt to re-establish the connection, else the component returns. In block 603, the component sets the retry loop flag to active. In block 604, the component initializes the backofflevel variable to 1. In block 605, the component calculates the retry delay as a function of the backofflevel. In block 606, the component waits for the retry delay. In block 607, the component invokes the logon component to attempt to re-establish the application-level connection with the server. The component then returns the status returned by the logon component. If the application-level connection cannot be re-established, then the service layer notifies the application layer.

From the foregoing, it will be appreciated that specific embodiments of the system have been described herein for purposes of illustration, but that various modifications may be made without deviating from the spirit and scope of the invention. Accordingly, the invention is not limited except as by the appended claims.

We claim:

1. A method in a client for establishing a connection with a server, the client having an application layer and a service layer, the application layer using a session initiation protocol ("SIP") and the service layer using a communication-level protocol that is different from the session initiation protocol, the client and the server being computing devices, the method comprising:

under control of the application layer executing at the client, providing to the service layer a SIP INVITE request to establish an application-level connection with a server using the session initiation protocol; and under control of the service layer executing at the client, providing to the application layer services for accessing a server including a service for, upon being provided with the SIP INVITE request, sending to a server using the communication-level protocol the SIP INVITE request to establish an application-level connection between the client and the server;

detecting that the client is no longer connected to the server via the application-level connection;

after detecting that the client is no longer connected to the server via the application-level connection, attempting to re-establish an application-level connection between the client and a server without notifying the application layer that the client is no longer connected to the server via the application-level connection by sending to a server using the communication-level protocol a SIP INVITE request to establish a new application-level connection with a server;

when an application-level connection is re-established with a server, resuming the providing of services to the application layer; and when an application-level connection is not re-established with a server, notifying the application layer that the client no longer has an application-level connection to the server;

wherein the service layer that uses a communication-level protocol re-establishes an application-level connection to a server without notifying the application layer that it was detected that the client was no longer connected to the server via the application-level connection and without notifying the application layer that the application-level connection was re-established with a server; and wherein a communications layer controls the transport of application-level messages to the server via a communications-level connection and wherein the client is no longer connected to the server via the application-level connection when the communications-level connection is broken.

2. The method of claim 1 wherein the server is in a pool of servers that each provide services to clients and the re-established connection is with a server other than the server to which the client was last connected.

3. The method of claim 1 wherein when the service layer receives a request from the application layer to perform a service while the client is no longer connected to the server via the application-level connection, delaying the performing of the requested service until the application-level connection is re-established.

4. The method of claim 1 wherein when the service layer receives a request from the application layer to perform a service while the client is no longer connected to the server via the application-level connection, notifying the application layer that the service is temporarily unavailable.

5. The method of claim 1 wherein the server is a presence server.

6. The method of claim 1 wherein the server is an instant messaging server.

7. The method of claim 1 wherein the application-level connection is established by the client logging on to the server.

8. The method of claim 1 wherein the server is in a pool of servers that each provide services to clients and wherein the application-level connection is established by the client logging on to the server.

9. A computer-readable storage medium containing computer-executable instructions for controlling a client to establish a connection with a server, the client having an application layer and a service layer, the application layer using a session initiation protocol ("SIP") and the service layer using a communication-level protocol that is different from the session initiation protocol, the client and the server being computing devices, by a method comprising:

under control of the application layer executing at the client, providing to the service layer a SIP INVITE request to establish a first application-level connection with a first server using the session initiation protocol; and under control of the service layer executing at the client, providing to the application layer services for accessing the first server including a service for, upon being provided with the SIP INVITE request, sending to the first server using the communication-level protocol the SIP INVITE request to establish the first application-level connection between the client and the first server;

detecting that the client is no longer connected to the first server via the first application-level connection;

after detecting that the client is no longer connected to the first server via the first application-level connection, attempting to establish a second application-level connection between the client and a second server without notifying the application layer that the client is no longer connected to the first server via the first application-level connection by sending to the second server using the communication-level protocol a SIP INVITE request to establish a second application-level connection with the second server;

when the second application-level connection is established with the second server, resuming the providing of services to the application layer; and when the second application-level connection is not established with the second server, notifying the application layer that the client no longer has the first application-level connection to the first server;

wherein the service layer that uses the communication-level protocol establishes the second application-level connection to the second server without notifying the application layer that it was detected that the client was no longer connected to the first server via the first application-level connection and without notifying the application layer that the second application-level connection was established with the second server; and wherein a communications layer controls the transport of application-level messages to the servers via a communications-level connection and wherein the client is no longer connected to the first server via the first application-level connection when the communications-level connection is broken.

10. The computer-readable storage medium of claim 9 wherein the first server and the second server are in a pool of servers that each provide services to clients and the first server is different from the second server.

11. The computer-readable storage medium of claim 9 wherein when the service layer receives a request from the application layer to perform a service while the client is no longer connected to the first server via the first application-level connection, delaying the performing of the requested service until the second application-level connection is established.

12. The computer-readable storage medium of claim 9 wherein when the service layer receives a request from the application layer to perform a service while the client is no longer connected to the first server via the first application-level connection, notifying the application layer that the service is temporarily unavailable.

13. The computer-readable storage medium of claim 9 wherein the first server and the second server are presence servers.

14. The computer-readable storage medium of claim 9 wherein the first server and the second server are instant messaging servers.

15. The computer-readable storage medium of claim 9 wherein the first application-level connection is established by the client logging on to the server.

16. The computer-readable storage medium of claim 9 wherein the first server is in a pool of servers that each provide services to clients and wherein the first application-level connection is established by the client logging on to the first server.

17. A client computing device for establishing a connection with a server computing device, the client computing device having an application layer and a service layer, the application layer using a session initiation protocol ("SIP") and the service layer using a communication-level protocol that is different from the session initiation protocol, comprising:

a memory storing computer-executable instructions of:

a component that, under control of the application layer, provides to the service layer a SIP INVITE request to establish an application-level connection with the server computing device using the session initiation protocol; and a component that, under control of the service layer, provides to the application layer services for accessing the server computing device including a service for, upon being provided with the SIP INVITE request, sending to the server computing device using the communication-level protocol the SIP INVITE request to establish the application-level connection between the client computing device and the server computing device;

detects that the client computing device is no longer connected to the server computing device via the application-level connection;

in response to detecting that the client computing device is no longer connected to the server computing device via the application-level connection, attempts to re-establish the application-level connection between the client computing device and the server computing device without notifying the application layer that the client computing device is no longer connected to the server computing device via the application-level connection by sending to the server computing device using the communication-level protocol a SIP INVITE request to re-establish the application-level connection with the server computing device;

in response to the application-level connection being re-established with the server computing device, resumes the providing of services to the application layer; and in response to the application-level connection being not re-established with the server computing device, notifies the application layer that the client computing device no longer has the application-level connection to the server computing device;

wherein the service layer that uses the communication-level protocol re-establishes the application-level connection to the server computing device without notifying the application layer that it was detected that the client computing device was no longer connected to the server computing device via the application-level connection and without notifying the application layer that the application-level connection was re-established with the server computing device; and wherein a communications layer controls the transport of application-level messages to the server computing device via a communications-level connection and wherein the client computing device is no longer connected to the server computing device via the application-level connection when the communications-level connection is broken; and a processor for executing the computer-executable instructions stored in the memory.

18. The client computing device of claim 17 wherein the server computing device is in a pool of server computing devices that each provide services to client computing devices.

19. The client computing device of claim 17 wherein when the service layer receives a request from the application layer to perform a service while the client computing device is no longer connected to the server computing device via the application-level connection, delaying the performing of the requested service until the application-level connection is re-established.

20. The client computing device of claim 17 wherein when the service layer receives a request from the application layer to perform a service while the client computing device is no longer connected to the server computing device via the application-level connection, notifying the application layer that the service is temporarily unavailable.

21. The client computing device of claim 17 wherein the server computing device is a presence server.

22. The client computing device of claim 17 wherein the server computing device is an instant messaging server.

23. The client computing device of claim 17 wherein the application-level connection is established by the client computing device logging on to the server computing device.

24. The client computing device of claim 17 wherein the server computing device is in a pool of server computing devices that each provide services to client computing devices and wherein the application-level connection is established by the client computing device logging on to the server computing device.

* * * * *

UNITED STATES PATENT AND TRADEMARK OFFICE
CERTIFICATE OF CORRECTION

PATENT NO.       : 7,594,020 B2                                    Page 1 of 1
APPLICATION NO. : 11/142901
DATED            : September 22, 2009
INVENTOR(S)      : Apreutesei et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 822 days.

Signed and Sealed this

Fourteenth Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,594,020 B2 | |
| APPLICATION NO. | : 11/142901 | |
| DATED | : September 22, 2009 | |
| INVENTOR(S) | : Elena Apreutesei et al. | |

It is certified that error appears in the above-identified patent and that said Letters Patent is hereby corrected as shown below:

On the Title Page, Item (56), under "Other Publications" line 6, below "U.S. Appl. No. 11/142,895, filed May 31, 2005, Apreutesei et al." insert -- Rosenberg, J., H. Schulzrinne, G. Camarillo, A. Johnston, J. Peterson, R. Sparks, M. Handley and E. Schooler, "RFC 3261 - SIP: Session Initiation Protocol," Network Working, Obsoletes: 2543, Standards Track The Internet Society, June 2002, p. 1-209.
Day, M., J. Rosenberg and H. Sugano, "A Model for Presence and Instant Messaging," February 2000, Request for Comments: 2778, Network Working Group, The Internet Society 2000, p. 1-17. --.

In column 1, line 34, after "available" delete "at".

In column 3, line 15, after "available" delete "at".

Signed and Sealed this
Eighth Day of February, 2011

David J. Kappos
*Director of the United States Patent and Trademark Office*